Figure 1:
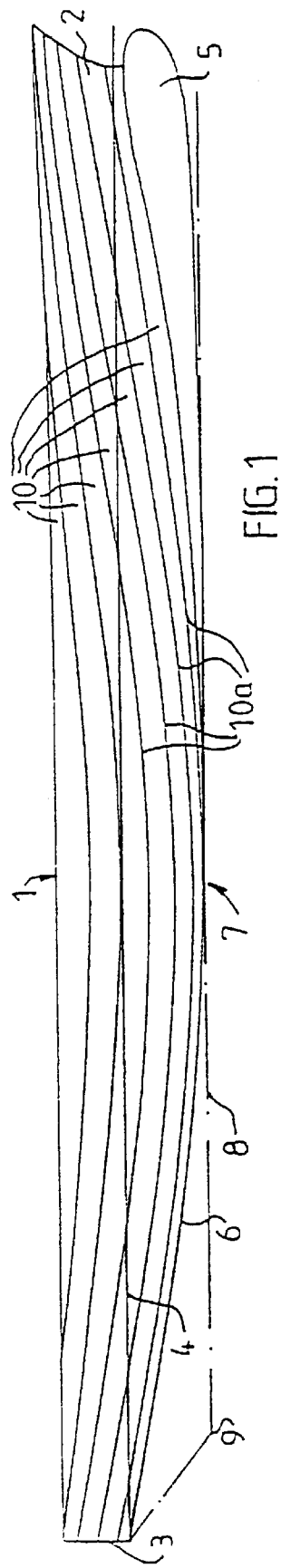

United States Patent [19]
Mannerfelt

[11] Patent Number: 6,058,864
[45] Date of Patent: May 9, 2000

[54] SHIP HULL AND VESSEL WITH SUCH A HULL

[75] Inventor: Ocke Mannerfelt, Täby, Sweden

[73] Assignee: AB Volvo Penta, Gothenburg, Sweden

[21] Appl. No.: 09/180,608

[22] PCT Filed: May 13, 1997

[86] PCT No.: PCT/SE97/00785

§ 371 Date: Nov. 12, 1998

§ 102(e) Date: Nov. 12, 1998

[87] PCT Pub. No.: WO97/43169

PCT Pub. Date: Nov. 20, 1997

[30] Foreign Application Priority Data

May 13, 1996 [SE] Sweden .................................. 9601836

[51] Int. Cl.[7] .................................................. B63B 1/00
[52] U.S. Cl. .................. 114/61.28; 114/61.3; 114/61.31; 114/72
[58] Field of Search .............................. 114/72, 73, 56.1, 114/57, 61.27, 61.28, 61.29, 61.3, 61.31, 61.32

[56] References Cited

U.S. PATENT DOCUMENTS

| 3,511,203 | 5/1970 | Buyscoll | 114/61.28 |
| 4,158,416 | 6/1979 | Podesta | 114/72 |
| 5,299,520 | 4/1994 | Wilts . | |

FOREIGN PATENT DOCUMENTS

| 2 600 614 | 12/1987 | France . |
| 974 605 | 2/1961 | Germany . |
| 1 932 929 | 2/1971 | Germany . |
| 63-247197 | 10/1988 | Japan . |

OTHER PUBLICATIONS

Stig Gunnar Skoot, Elvströmbåt med bulb, På Kryss & Till Rors, vol. 46, No. 3, Mar. 1975, p. 54.

*Primary Examiner*—Stephen Avila
*Attorney, Agent, or Firm*—Young & Thompson

[57] ABSTRACT

A ship hull with bulb prow and with bottom which extends without sharp changes from the bulb to the square stern of the hull along continuously bent longitudinal lines and with hull sides which are inclined from the vertical plane from the waterline to the bottom plane.

8 Claims, 3 Drawing Sheets

SHIP HULL AND VESSEL WITH SUCH A HULL

The present invention relates to a ship hull in the shape of an elongated streamlined body which has a prow which when seen in the horizontal plane is V-shaped above the waterline of the hull with a bulb under the waterline at one end and a square stern at the opposite end. The invention also relates to a motor driven cargo vessel with a hull of this kind.

Modern cargo vessels with a hull of the type mentioned above have a hull shape which is load capacity optimised. This means amongst others that the hull has a nearly flat bottom from the region behind the bulb in the prow to a short distance in front of the square stern where the bottom slants upwards towards the bottom edge of the square stern. The hull sides are completely vertical and pass over to the flat bottom via parts curved with a small radius. The advantages of this shape are obvious in, for example, container vessels, because it is possible to dimension the cargo space of the vessel according to the shape of container so that the maximum number of containers can be freighted with least possible wasted space. The disadvantages are, however, on the one hand that the vessel has a low shape stability and must be ballasted when it sails unloaded and on the other hand that it is not hydrodynamically optimised.

The purpose of the present invention is to provide a ship hull of the type mentioned in the introduction which can be hydrodynamically optimised and which has a higher shape stability than a cargo capacity optimised ship hull so that for example it does not need to be ballasted when it sails without cargo.

This is achieved according to the invention by the bottom of the hull, at least between the transition between the bulb and the hull and the waterline of the square stern, extending without any sharp changes along longitudinal lines which are curved over at least the largest part of the length and that the hull in cross-section having sides which at least over the largest part of their vertical extent from the waterline to the bottom plane are inclined to the vertical plane. With a hull of this type a 10% lower towing drag than a classic design of this hull calculated by the Holtrop-method is achieved but on the other hand it results in the bottom shape in the space in the fore and after-bodies of the hull being unsuitable for cargo such as, for example, containers.

The invention, however, is based on the idea of using such spaces for other purposes than for cargo so that a cargo ship with a hull according to the invention can lower the total transport cost compared to transporting in a conventional cargo capacity optimised vessel.

A preferred embodiment of a vessel with a hull according to the invention has in the forebody a first engine room with a plurality of diesel motor driven generators and in the afterbody a second engine room with a number of electric motors coupled to two propeller shafts. A vessel with a power requirement of approximately 4000 kW can, for example, have ten diesel motors each having an output of approximately 400 kW which without problem could be accommodated in the front half of the vessel, for example under the superstructure of the vessel.

The invention will be described in more detail with reference to the embodiments shown on the annexed drawings, where FIG. 1 shows a lateral view of the hull of a vessel according to the invention, FIG. 2 an enlarged frame plan of the hull in FIG. 1, FIG. 3 a view from below of the hull of a vessel shown in FIGS. 1 and 2 and FIG. 4 a perspective view of a container cargo vessel with a hull according to the invention.

In the Figures reference numeral 1 describes generally a ship's hull which has a prow 2 which is V-shaped when seen in the horizontal plane and a flat square stern 3 above the waterline 4. Under the waterline 4 the prow has a bulb 5. As is evident from the contour line 6 the bottom 7 runs in a continuous gentle curve without any sharp changes from the bulb 5 all the way to the waterline of the afterbody, which in the example shown forms the bottom edge of the square stern. As a comparison reference can be made to the chain-dotted line 8 in FIG. 1 which marks the corresponding bottom contours of a conventional cargo vessel of modern design. As is evident in FIG. 1 the line 8 is a straight line from the bulb 5 to just before the square stern 3 where it slopes upwards at 9 towards the square stern.

The hull 1 is built up of elongated single curved plates 10 which are welded together with each other so that the weld seams 10a essentially follow the actual flow direction of the water along the hull. As is especially evident from FIG. 2 the plates 20 incline under the waterline 4 from the vertical plane 11 and the inclination increases continuously from the waterline 4 downwards towards the bottom surface 12. In order to show the difference from the shape of the bottom and sides or a conventional cargo ship of modem type the latter has been shown with chain-dotted line 13 in FIG. 2.

The illustrated and described shape of the hull 1 gives the hull a greater shape stability than a conventional hull with the shape which is shown with chain-dotted lines 13 partly because of the larger width compared with a conventional hull and partly because of the inclination of the hull sides. The stability is increased thereby by a factor of approximately 2.5 compared with a conventional vessel. The tow drag of the hull 1 will be approximately 10% lower than that of a classic design.

Figure 2:
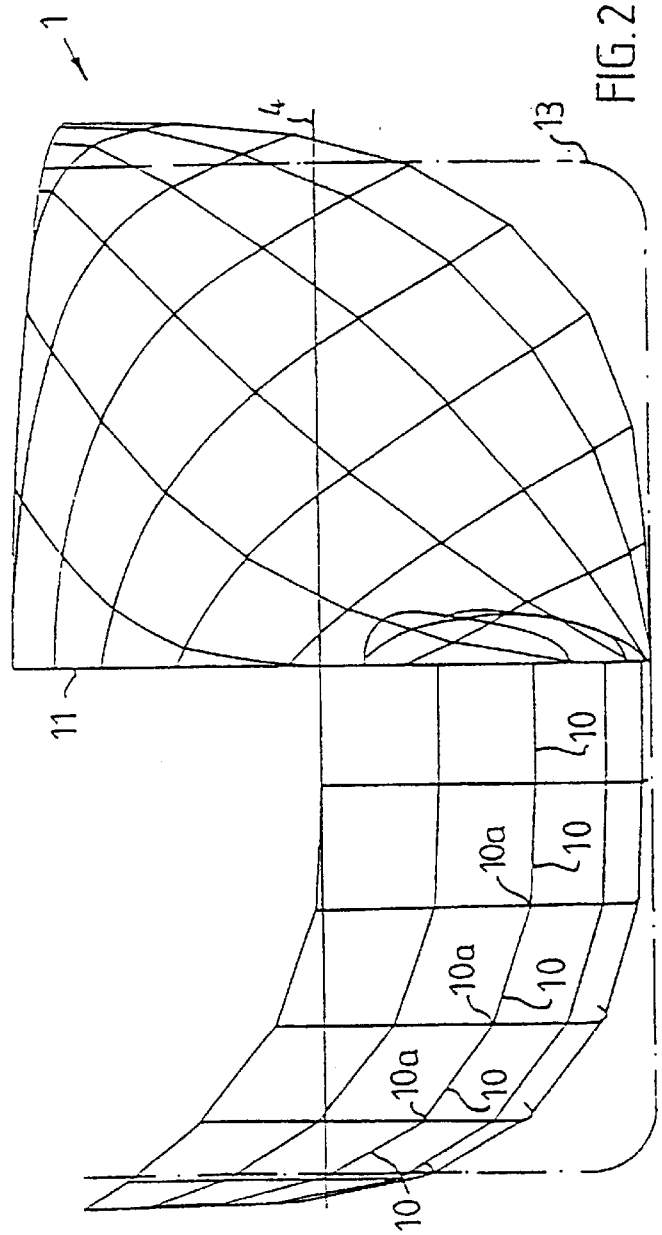

It is evident from FIGS. 1 and 2 that the hull space in the vertical direction in the fore and after-bodies of the hull 1, especially in the after-body, is less than in a conventional hull. This is compensated to a certain extent by the greater width and the greater space between the fore and after-bodies and also by the greater shape stability which permits higher deck cargos.

The loss of a certain amount of cargo space in the fore and end bodies can, however, be further compensated in a vessel with a hull 1 according to the invention.

Figure 3:
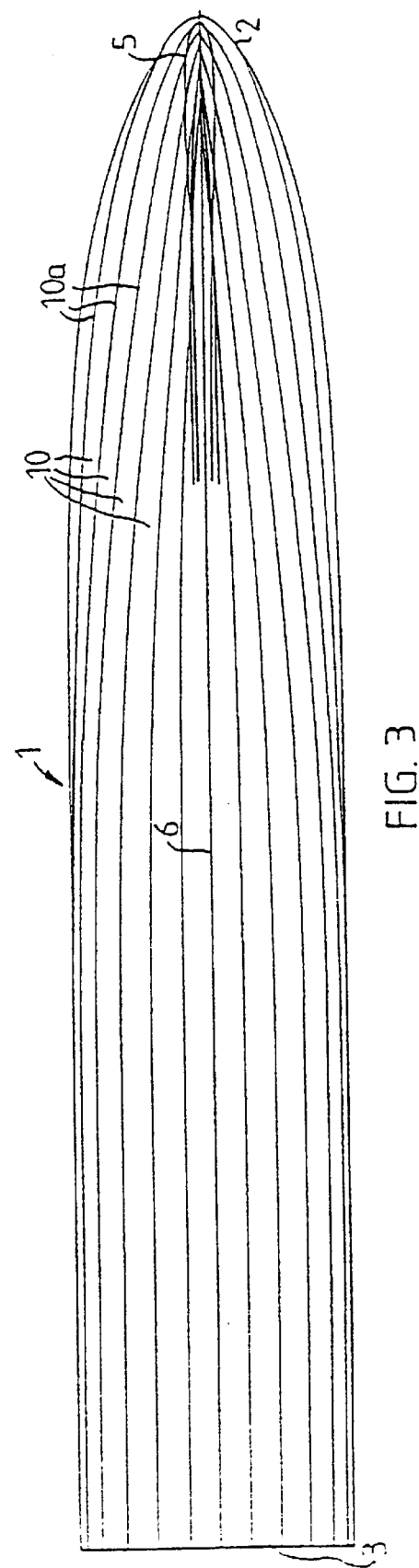
Figure 4:
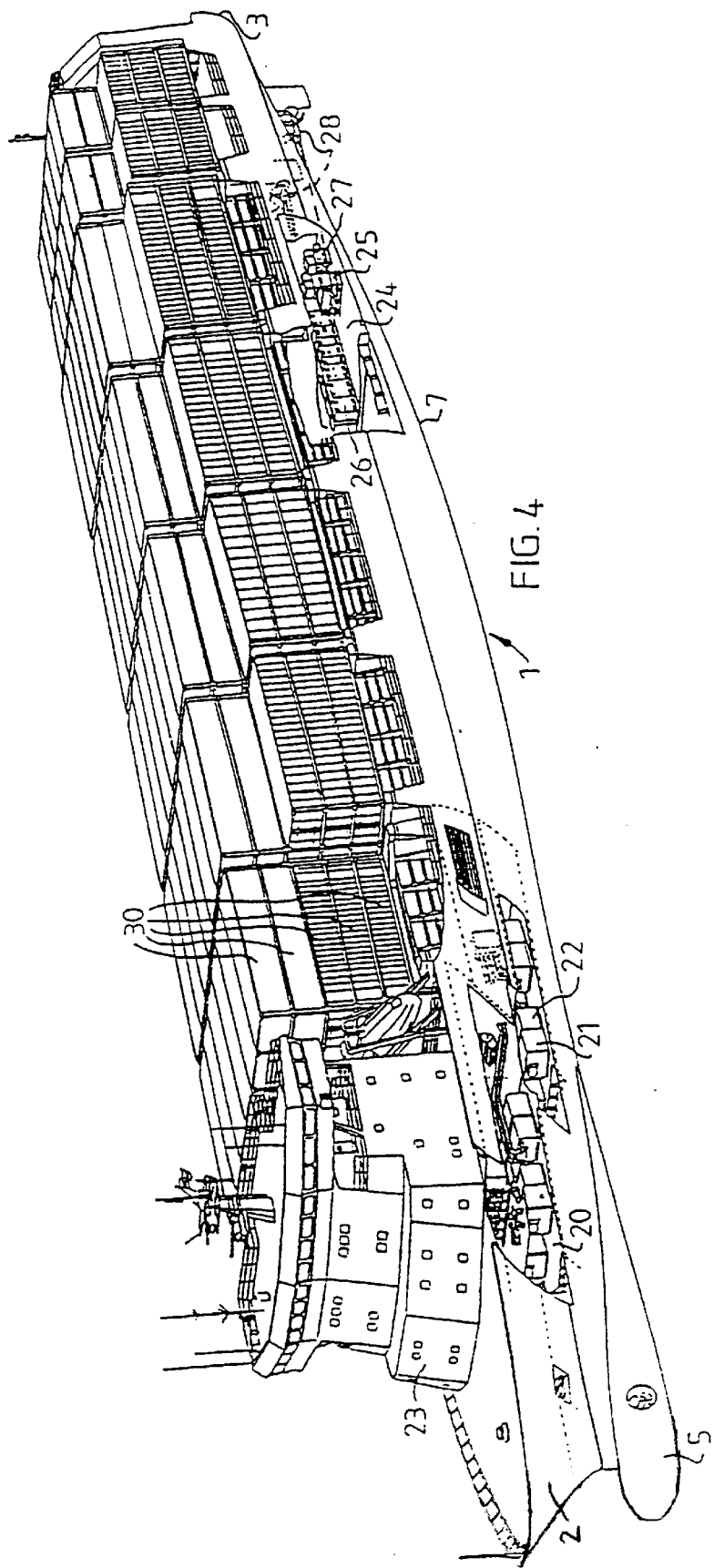

An embodiment is shown in FIG. 3 where details with counterparts in FIGS. 1 and 2 have the same reference numerals as in FIGS. 1 and 2.

In the fore body of the hull 1 in direct contact with the V-shaped prow 2 is a first engine room 20 which accommodates a plurality of diesel motors 21 which are each coupled to an electric generator 22. A vessel with a power requirement of 4000 kW can for example have ten diesel motors each producing 400 kW of power. In contrast to a single ship's diesel in the power class 4000 kW which requires a large vertical space, the drive machinery 21, 22 shown takes up only a little space vertically and therefore can be placed in a space directly under the superstructure 23 of the vessel, that is to say a space which normally is not usable as cargo space as it is not accessible from above. In the aft body of the hull 1 in the part which is relatively shallow is a second engine room 24 which receives a number of electric motors 25 as well as the other electrical equipment 26 which is required for the supply of power from the generators 22 to the electric motors 25. The electric motors 25 drive two propeller shafts 28 via reduction gearings 27. Through the described arrangement the widest part of the hull over a large part of its length can be used as cargo space. Through its greater width in comparison to a conventional ship's hull with the same length and its greater shape stability a vessel with a hull according to the invention can take a higher deck cargo which is illustrated in FIG. 3 by containers 30 stacked five high.

Further advantages with dividing up the drive machinery into a plurality of motors in this way are on the one hand there is always power available if one or some of the motors should stop, and on the other hand that safety is increased if the motors are grouped in several separate engine rooms which are fireproof with respect to each other and the rest of the surroundings.

I claim:

1. Ship hull for a cargo ship, a passenger ship or the like in the shape of an elongated streamlined body which has, when seen in the horizontal plane, a V-shaped prow above the waterline of the hull with a bulb under the waterline at one end, and a square stern at the opposing end, characterised in that the bottom lines (6) of the hull (1) extend without any sharp changes, at least between the transition from the bulb (5) to the hull and the waterline (4) of the square stern, along longitudinal vertical planes, said bottom lines being curved over at least the greatest part of their length, and that the hull in cross-section has sides (10) which are inclined at least over the greatest part of the vertical extent from the waterline (4) to the longitudinal vertical midplane (11).

2. Ship hull according to claim 1, characterised in that the bottom (7) of the hull (1) in a vertical central plane (11) in the longitudinal direction extends from the front end of the bulb (5) to the square stern along a continuously bent line (6).

3. Ship hull according to claim 1, characterised in that the hull (1) is made up of single curved plates (10) which run in the longitudinal direction of the hull and which are welded together and that the seams (10a) run in essentially the direction of the flow of water along the hull.

4. Ship hull according to claim 3, characterised in that seen in the cross-section through the hull (1) the inclination of the plates (10) increases from the waterline (4) downwards towards the bottom plane.

5. Vessel with a hull according to claim 1, characterised in that the hull (1) has a first engine room (20) with machinery (21,22) which is positioned in the front half of the hull.

6. Vessel according to claim 5, characterised in that the hull (1) has a super-structure (23) which is positioned above the engine room (20).

7. Vessel according to claim 5, characterised in that the machinery in the first engine room (20) comprises at least one drive motor and a generator driven by this and that a second engine room (24) is positioned in the stern half of the hull and contains at least one electric motor (25) which is supplied with power from the generator (22) and coupled to a propeller shaft (28).

8. Vessel according to claim 7, characterised in that a plurality of diesel motors (21) with associated generators (22) are arranged in the first engine room (20).

* * * * *